Jan. 26, 1943.       R. L. CHENAULT       2,309,499
SHOCK ABSORBING APPARATUS
Filed March 22, 1941        2 Sheets-Sheet 2
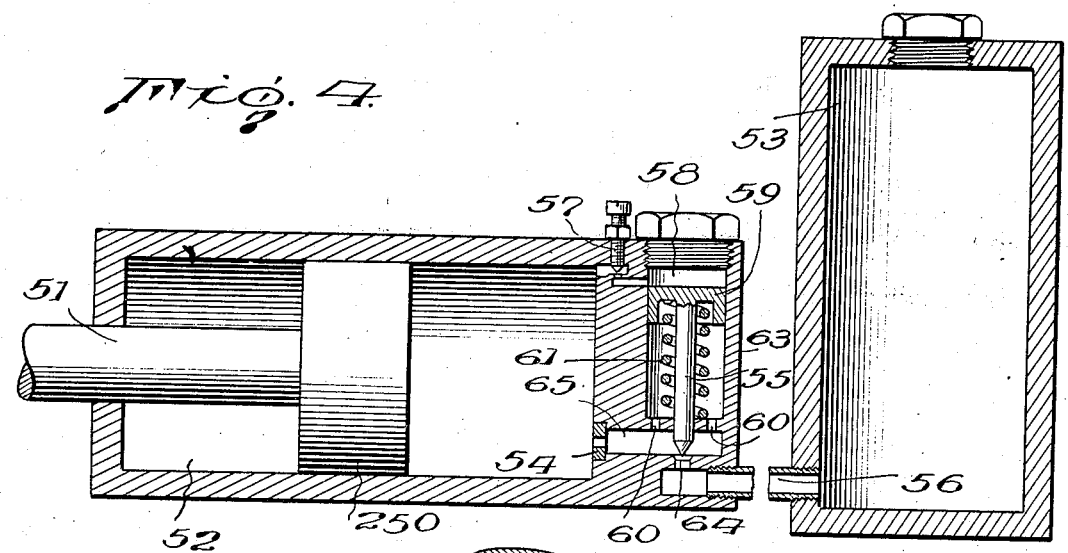
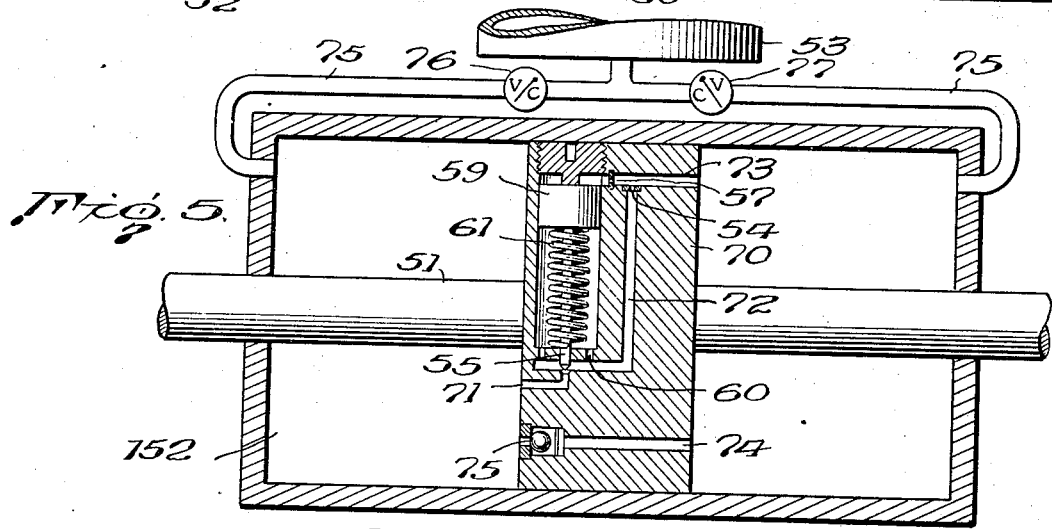
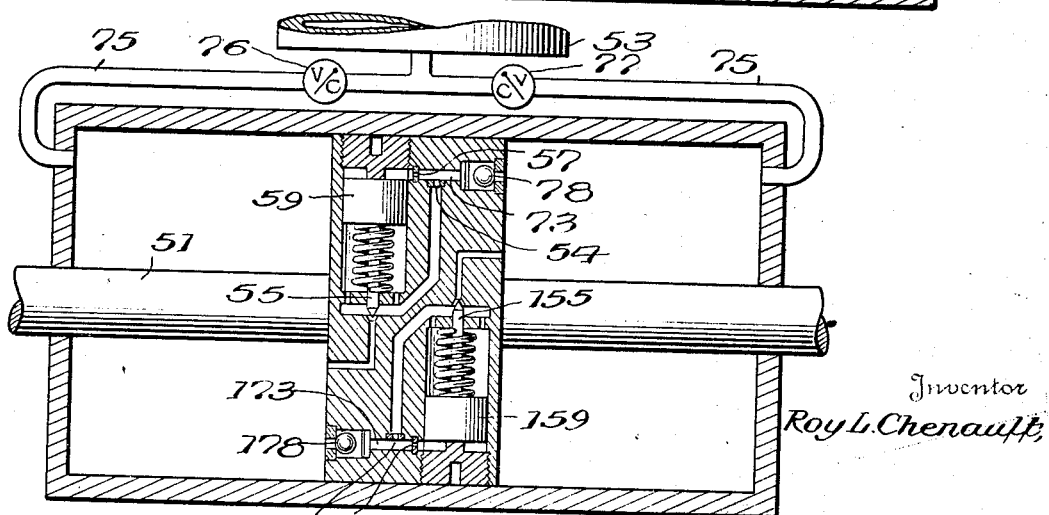
Inventor
Roy L. Chenault Patented Jan. 26, 1943

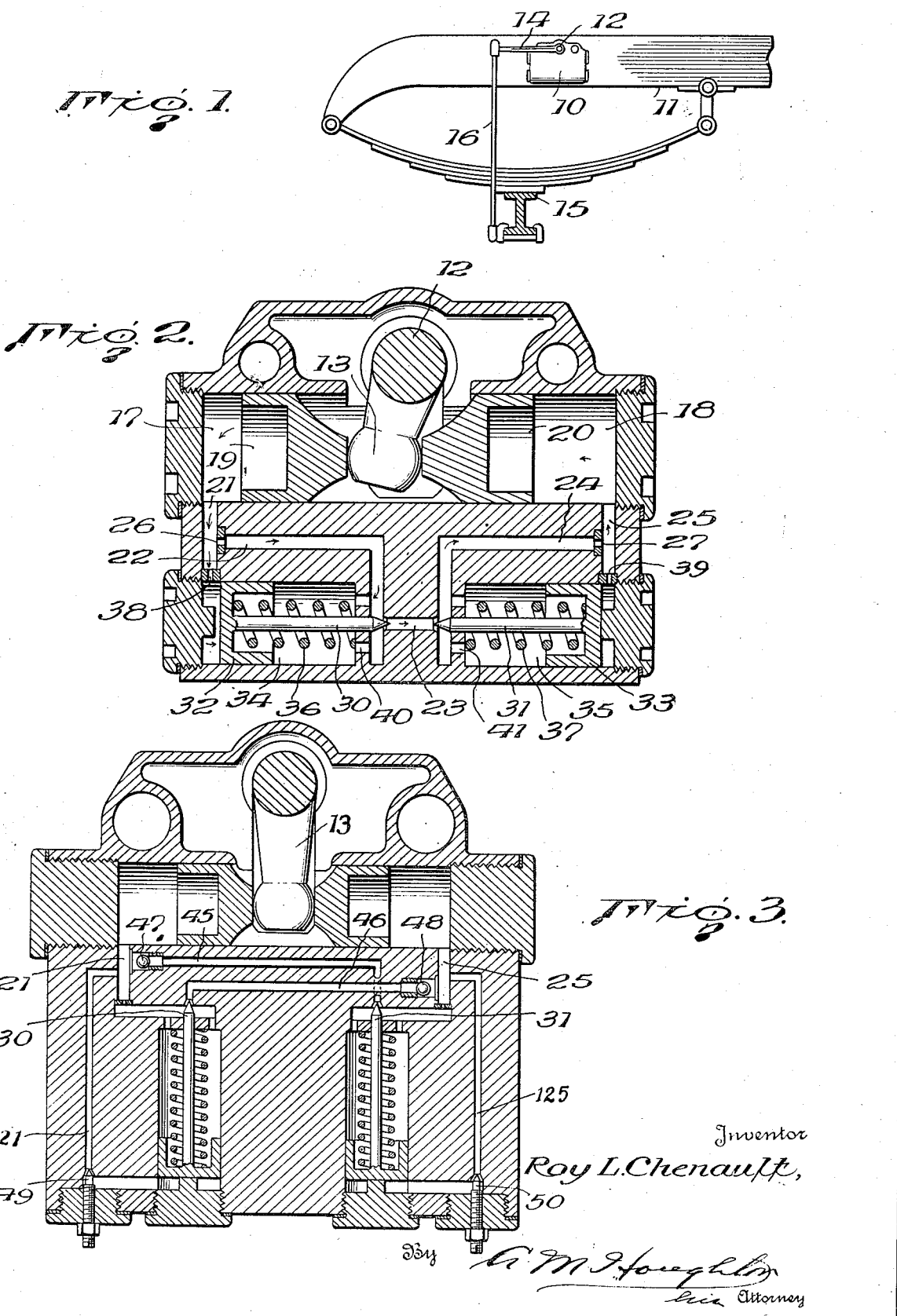

2,309,499

UNITED STATES PATENT OFFICE 2,309,499

SHOCK ABSORBING APPARATUS

Roy L. Chenault, Oakmont, Pa., assignor to Gulf Research & Development Company, Pittsburgh, Pa., a corporation of Delaware Application March 22, 1941, Serial No. 384,759

6 Claims. (Cl. 188—88)

This invention relates to shock absorbing apparatus; and it comprises, in such apparatus of the hydraulic type including a working cylinder, a working piston therein adapted to confine a liquid in the space between the piston and one end of the cylinder, and a restricted discharge passage from said space for discharge of liquid to a low pressure zone, the improvement comprising a normally open control valve in said passage, hydraulically operable means for urging the valve toward closed position, and a restricted duct delivering discharged liquid under pressure to the hydraulically operable means; whereby on the working stroke of the piston discharge of liquid is governed by the degree of restriction of said restricted passage, and later by the degree of closure of said valve under the influence of operating pressure applied thereto through said duct; all as more fully hereinafter set forth and as claimed.

Hydraulic type shock absorbers make use of a piston, subject to the shock movement, arranged to squeeze liquid out of a cylinder through a restricted passageway; shock energy being dissipated as friction in the liquid flowing therethrough. In some cases a fixed throttling orifice is used to provide the restriction. The orifice type shock absorber has desirable characteristics at each extreme end of its stroke. But if a sudden hard shock is encountered, the resulting very high velocity is accompanied by a very high resistance: resistance to flow through an orifice increases as the square of the velocity. The motion is slowed down too suddenly and a considerable shock may result because the full spring action which should be utilized is not permitted to come into play. In this type, the characteristics of the action are determined by the laws of flow through an orifice and these inherent characteristics cannot be changed.

In other known types spring-loaded valves are employed to furnish the obstruction to discharge of liquid from the cylinder. In this case, a definite resistance to flow is offered both at the beginning of the stroke and at the end, so that if the shock absorber is designed to give the desired resistance to motion between the two extreme positions the effect is equivalent to that of a stiffer spring near each extreme of the compressed and free positions of the spring. In other words, shock absorbers utilizing spring-loaded valves for resisting the flow of fluid offer a practically constant resistance to the flow of fluid at all rates of motion. This is not the most desirable type of action.

Various attempts have been made to combine the characteristics of spring-loaded and orifice-type shock absorbers, but in general they function in more or less definite steps or stages so that a continuous transition from a low to a high resistance to flow, and back again to a low resistance is not obtained.

In the present invention a shock absorbing system is provided which combines the advantageous features of both the fixed orifice controlled systems, and spring loaded valve controlled systems, and achieves new and additional advantages. According to the invention a fixed orifice is provided in the discharge passage from the cylinder, and in addition a hydraulically operated valve, normally urged toward open position by a spring, but adapted to be urged toward closed position upon application of fluid pressure thereto. A duct is provided to deliver liquid discharged from the cylinder to the valve, and this duct is choked down by a fine orifice, so that upon sudden increase of discharge pressure, application of full discharge pressure to the valve is delayed for an appreciable time. With a constant force applied to the piston rod the piston will therefore move more rapidly at first and will gradually slow down as the valve stem lowers to its equilibrium position, and from this time on the piston will move at a constant velocity regardless of the force applied so long as this force is sufficient to overcome friction. For shock-absorber service the force applied is practically always either increasing or decreasing, and when the valve stem reaches its equilibrium position—which would result in a constant velocity of the piston for a continuously applied force—the velocity immediately begins to decrease, the valve begins opening wider as a result of the lower differential pressure across the main orifice, and as the motion is brought to rest the valve resumes its normal wide-open position.

The apparatus is simple in construction and is applicable to a wide range of shock-absorbing requirements.

In the accompanying drawings there are shown, diagrammatically, several examples of specific embodiments of apparatus within the purview of the invention. In the drawings Fig. 1 is a view in elevation of a shock-absorber according to the invention, installed in a motor vehicle, Fig. 2 is a view in central vertical section with some parts in elevation of one form of double-acting shock absorbing apparatus embodied as a vehicle shock-absorber, Fig. 3 is a similar view of a modification of Fig. 2 with adjusting means, Fig. 4 is a similar view of a modification of the invention of single-acting construction with controls in the cylinder head, Fig. 5 is a similar view of a modification of the apparatus of Fig. 4 with controls in the piston, and Fig. 6 is a similar view of a modification of the apparatus of Figs. 4 and 5 adapted for double action.

Referring to the drawings and more especially to Figs. 1 and 2, the embodiment shown comprises a housing 10, adapted for attachment to a vehicle frame 11 and carrying a shaft 12 provided with a cam 13 and an outside crank 14. The crank is connected to the spring-carried vehicle axle 15 through a link 16, for reciprocation as the axle moves with respect to the frame.

The housing defines a bore or cylinder having left and right portions 17, 18, in which a pair of working pistons 19 and 20 are fitted, for reciprocation by the cam. The cylinder heads are adapted for liquid communication with each other through passages 21, 22, 23, 24 and 25. Passages 22 and 24 are throttled by fixed restricted orifices 26 and 27 of substantially identically the same size, as shown, and by two variable throttle valves 30 and 31 cooperating with seats at the ends of passages 23 and operable by control valve pistons 32 and 33 sliding in bores 34 and 35. The valves are urged toward open position by springs 36, 37 arranged as shown.

The outer faces of the control valve pistons are in communication with passages 21 and 25 through small choke orifices 38 and 39, as shown.

The housing in service is completely filled with a suitable liquid, e. g. oil or glycerine, not shown.

Operation of the apparatus is as follows:

A sudden compression of the vehicle spring results in a motion of pistons 19 and 20 from right to left, thereby displacing liquid through passage 21, orifice 26, passage 22, past valve 30, through passages 23, 24, orifice 27 and passage 25 to the cylinder 18. At the beginning of this motion, valves 30 and 31 are in a wide-open position; valve 31 remains in this position, but valve 30 begins closing at a rate depending on the differential pressure across orifice 26 and on the opening through orifice 38. The resistance to flow of the fluid from chamber 17 to chamber 18 through downstream orifice 27 may, for all practical purposes, be disregarded since orifice 27 is substantially identical in size with orifice 26. Pressure on the downstream side of orifice 26 is applied to the inner side of piston 32 through ports 40. The rate of closing of valve 30, therefore, depends indirectly on the intensiy of the shock. Valve 30 continues to close until the differential pressure across orifice 26, times the area of piston 32, is just balanced by the tension of the spring 36. When this condition is reached the piston 19 cannot travel at a higher velocity regardless of the force applied. As a matter of fact the velocity of the piston decreases continuously until this condition is reached, and with a shock force of this nature the motion does not continue at a constant velocity for any appreciable time after equilibrium is reached because the energy of the impact is being dissipated and the vehicle spring offers more resistance as it becomes further compressed. The valve 30 therefore starts opening again immediately after its lowermost position is reached, since the differential pressure across orifice 26 decreases as the relative motion between the axle and frame of the vehicle decreases. When this relative motion finally stops at a point where the vehicle spring has reached its maximum compression there is no flow through the shock-absorber system, and differential pressure across orifice 26 drops to zero and the spring 36 reopens valve 30 to a wide-open position.

As the frame of the vehicle rebounds after compression of the vehicle spring, the working pistons are moved to the right by cam 13 and liquid is displaced from cylinder 18 through passage 25, orifice 27, passage 24, valve 31, passages 23, 22 and 21 to cylinder 17. The flow-controlling valve 31 acts in an identical manner to the opposite valve just described to check the rebound and prevent damage to the spring and improve the riding qualities of the vehicle.

An important feature is that the control valve is wide open at the beginning of a shock-absorbing cycle, and the flow is throttled gradually by the valve to bring the relative motion of frame and spring to a gradual stop, at which time the valve is again opening to permit only the spring to support the weight of the vehicle at this time. In other words, the shock-absorber automatically has least effect when the relative motion between spring and vehicle is least, and most effect when this motion is greatest, permitting the maximum cushioning effect of the vehicle spring both at the beginning and at the end of a compression or rebound stroke resulting from a sudden shock.

In this apparatus the parts are so proportioned that the resistance of the orifices 26 and 27 is very small relative to the resistance through the valves 30 and 31 except when the valves are wide open, and a relatively small differential pressure across these orifices is all that is necessary to close the flow controlling valves to their minimum opening so that the direct effect of orifices 26 and 27 is very slight in controlling the motion of the working pistons. Practically all the resistance to flow is through the control valves 30 and 31 and these valves come into effect gradually as a result of the small orifices 38 and 39.

A significant advantage of this shock-absorber is that of durability of the valves and seats. The flow-controlling valves, as a matter of fact, never actually contact the seats. The flow is throttled to such a low value that the differential pressure across orifices 26 and 27 balances the tension of springs 36 and 37, before the valves can contact their seats, and the valves will remain in a position of minimum opening for a short time, or immediately start opening, depending upon the forces applied to the shock-absorber crank arm.

Fig. 3 shows a modification of the apparatus wherein separate flow passages are provided for the two control valves, a construction which provides a very unrestricted flow passage from the valves to whichever may be at the time the low pressure end of the working cylinder. Thus, in Fig. 3, passage 23 of Fig. 2 is replaced by two passages, 45 and 46, delivering respectively from valve 31 to passage 21 and branch 121, and valve 30 to passage 25 and branch 125; passages 45 and 46 being provided with check valves 47 and 48 to prevent by-passing of the control valves.

The chokes 38 and 39 which control the lag in controlling action of the apparatus as a whole, can be adjustable if desired. In Fig. 3 they take the form of threadedly-adjustable needle valves 49 and 50.

Fig. 4 shows a modification of the apparatus especially adapted for use with gun recoil mechanisms, polish rod hangers on well pumping rigs, or other apparatus requiring single-action operation. The absorbing means proper is shown as a piston 250 on rod 51 and fitted in a cylinder 52. In the cylinder head 63 is mounted a piston operated control valve 55, the piston 59 of which is urged toward open position by a spring 61, similar to that of Fig. 2. Cooperating with the valve is a seat 64. The valve controls the flow of fluid through passages 65 and 56 leading from the working cylinder to a reservoir 53, passage 65 having a restricted orifice 54. The control valve cylinder-head 58 communicates with the working cylinder through an adjustable throttle 57 set to provide a very small orifice.

In operation, assuming the piston rod 51 to be in operative relation to a gun, for example, in initial position the piston 250 is at or near the left end of the cylinder. On firing the gun, liquid (not shown) which fills the system to the right of the piston is forced through orifice 54, control valve 55, and passage 56 to the reservoir 53. Also, liquid from cylinder 52 is forced through the small orifice of throttle valve 57 into the control valve cylinder-head 58. Control valve piston 59 begins moving downward immediately as a result of a differential pressure across orifice 54, the downstream side of which is connected to the lower portion of the valve cylinder below piston 59 by means of ports 60. Piston 59 continues to lower until the flow through valve 55 is throttled to a point where the differential pressure across orifice 54 drops to a value at which the force acting downward on piston 59 just balances the force of the spring 61. This represents the point of maximum closure of valve 55, and the time required to reach this point depends on the opening of orifice 57 and the pressure applied to the fluid in cylinder 52. When this point of minimum valve opening is reached the energy of recoil has been largely dissipated and the valve 55 immediately begins to open to allow the working piston (and whatever mechanism is attached thereto) to come to rest in a very smooth manner.

As this apparatus can readily be regulated to produce optimum resistance characteristics for controlling the forces resulting from shock loads, it is posible to construct a shock-absorbing mechanism for giving a particular maximum allowable stress on a support in considerably less space than usual; or for a given allowed space the shock and maximum pressure in the cylinder can be reduced considerably. When the piston and rod are returned to initial position by suitable means (not shown), hydraulic liquid from the reservoir 53 returns to the recoil cylinder through valve 55 and orifice 54, or a separate return line may be provided from the bottom of reservoir 53 to cylinder 52. In the latter case a check valve would be necessary (as in Figs. 5 and 6) in the return line to prevent the fluid from by-passing the flow-control valve on the recoil stroke. In general, a separate recuperating mechanism of conventional type (not shown) is used, but if desired, air compressed in the reservoir 53 in the recoil stroke can be relied on to return the apparatus to initial position.

The characteristics of the apparatus are readily varied by adjustment of valve 57. Adjusting the valve nearer to closed position increases the time required for the valve 55 to reach its equilibrium position after a given shock force is applied to the piston 250 and the piston will travel farther before coming to rest. Increasing the opening of the orifice valve speeds up the action of the control valve 55. The time required for it to reach its equilibrium position becomes less and the stroke of the piston 250 is decreased. With a fixed throttling action at the location of throttle 57, an increase in opening of orifice 54 results in a slower action of control valve 55, and decreasing orifice 54 has the opposite effect.

In some cases it is desirable to incorporate the controlling mechanism within the piston itself, for the sake of compactness and protection thereof from damage. Figs. 5 and 6 show such constructions. In Fig. 5 a closed working cylinder 152 is provided, containing a piston 70 on rod 51 which is extended through both cylinder heads, as shown, to provide equal displacements in both directions. The piston contains a piston-operable control valve assembly 55, as in Fig. 4, disposed within piston 70 and adapted to control flow of liquid through passages 71, 72 and 73, as shown, passage 72 being restricted by a choke 54. Passage 73 communicates, through a fine choke 57 (conveniently of diameter about one-half that of orifice 54), with the space above control piston 59. A bypass 74, controlled by check valve 75 is provided in the piston to facilitate quick return of the piston in the recovery stroke.

In operation, the working stroke of the piston 70 (to the right) is like that of Fig. 4. On the recovery stroke, as the piston moves to the left, oil is displaced through passage 74.

Advantageously a reservoir 53 of liquid is provided to take care of any leakage through stuffing glands and volume variation due to temperature changes. The reservoir is connected to the ends of cylinder 152 through tubing 75 controlled by check valves 76 and 77 so that flow can take place only from the reservoir to the cylinders.

In Fig. 6 the apparatus of Fig. 5 is shown adapted for double action by duplicating the control valve system of Fig. 5; an additional control valve 155, being provided as shown. In Fig. 6 passage 74 is omitted; passages 73 and 173 being provided with check valves 78 and 178 as shown. Orifices 54 and 57, 154 and 157, are provided similarly to Fig. 5. The operation of the apparatus of Fig. 6 will be clear from the description of the foregoing figures.

In all the modifications described, the control valve springs required are very small because they do not resist the opening of the valve against the pressure in the main cylinder, but only counterbalance the force resulting from the differential pressure across the orifice in the main flow line. The springs need only be strong enough to overcome the weight and friction of the piston and valve stem.

What I claim is:

1. A shock absorber comprising a fluid compression chamber, means for compressing fluid in said chamber, a fluid discharge passage leading from said chamber to a low pressure zone, a valve for controlling the discharge of fluid through said passage, differential fluid pressure actuated means for operating said valve, a restriction in said passage on the upstream side of the valve, fluid communicating means connecting opposite sides of said differential fluid pressure actuated means with said discharge passage at respectively opposite sides of said restriction for operation of said means, and a second restriction of greater resistance than said first mentioned restriction, in the conduit for delivery of fluid to the side of the differential pressure actuated means to cause said means to move the valve toward closed position.

2. In a shock absorbing apparatus including a working cylinder, a working piston therein adapted to confine a liquid in the space between the piston and an end of the cylinder, and a discharge passage leading from said space for discharging liquid to a low pressure zone, the improvement comprising a normally open valve in said passage, differential pressure actuated means for operating said valve, a restriction in said passage on the upstream side of said valve, liquid communicating means connecting one side of said differential pressure actuated means with said passage between the valve and the restriction, a restricted duct connecting the other side of the differential pressure actuated means with the liquid in the cylinder on the upstream side of said first mentioned restriction whereby on the working stroke of the piston, discharge of liquid is initially governed by the degree of closing of said valve under the influence of liquid pressure applied to said differential pressure actuated means through said duct.

3. A shock absorbing apparatus comprising a working cylinder, a double-ended working piston in said cylinder adapted to confine a fluid between the ends of the piston and ends of the cylinder, a passage connecting the ends of the cylinder, a normally open valve for each end of the cylinder disposed in said passage, each of said valves being provided respectively with differential fluid pressure actuated means for operating the same, means for applying a differential fluid pressure to said differential fluid pressure actuated means including a restriction for each end of the cylinder in the passage between the valves and the respective ends of the cylinder, each of said differential fluid pressure actuated means being in open communication on one side with said passage between the respective valves and the respective restrictions, and fluid communicating means of greater resistance than said first mentioned restrictions, connecting the other sides of said differential fluid pressure actuated means respectively with the corresponding ends of the cylinder on the upstream side of said first mentioned restrictions.

4. The subject matter of claim 3 wherein said valves are of needle valve type construction.

5. A shock absorbing apparatus comprising a working cylinder, a working piston therein adapted to confine a liquid in the space between the piston and the ends of the cylinder, a pair of means for controlling movement of the piston in each direction of movement thereof, each of said means comprising a discharge passage between one side of the piston and the other, a normally open valve in said passage, differential pressure operated means for moving said valve, a restriction in said passage ahead of the valve, liquid communicating means connecting said differential pressure operated means with said passage between the valve and the restriction, a restricted duct connecting said differential pressure operated means with the passage on the upstream side of the restriction and an outwardly opening check valve at the discharge end of each of said passages.

6. A shock absorbing apparatus comprising a working cylinder, a working piston therein adapted to confine a liquid in the space between the piston and an end of the cylinder, a passage through the piston, a normally open valve in said passage, differential pressure actuated means for operating said valve, a restriction in the passage ahead of the valve, liquid communicating means connecting one side of said differential pressure actuated means with the passage between the valve and said restriction, a restricted duct for delivering liquid under pressure from said passage on the upstream side of said restriction to the other side of said differential pressure actuated means, a second passage through the piston and a check valve in said second passage arranged to close during the working stroke of the piston and to open during the return stroke thereof.

ROY L. CHENAULT.